(12) United States Patent
Barata Mendes Moreira

(10) Patent No.: US 10,473,064 B2
(45) Date of Patent: Nov. 12, 2019

(54) GAS RECIRCULATION VALVE FROM −40° C. TO 700° C

(71) Applicant: SOL ALVA MECÂNICA DE PRECISÃO S.A., Arganil (PT)

(72) Inventor: Francisco António Barata Mendes Moreira, Arganil (PT)

(73) Assignee: SOL ALVA MECÂNICA DE PRECISÃO S.A., Arganil (PT)

( * ) Notice: Subject to any disclaimer, the term of this patent is extended or adjusted under 35 U.S.C. 154(b) by 0 days.

(21) Appl. No.: 15/557,821

(22) PCT Filed: Mar. 2, 2016

(86) PCT No.: PCT/IB2016/051157
§ 371 (c)(1),
(2) Date: Sep. 13, 2017

(87) PCT Pub. No.: WO2016/147072
PCT Pub. Date: Sep. 22, 2016

(65) Prior Publication Data
US 2018/0128215 A1    May 10, 2018

(30) Foreign Application Priority Data

Mar. 13, 2015  (PT) .......................................... 108282

(51) Int. Cl.
*F02M 26/70*    (2016.01)
*F02D 9/10*    (2006.01)
(Continued)

(52) U.S. Cl.
CPC ........... *F02M 26/70* (2016.02); *F02D 9/1015* (2013.01); *F16K 1/222* (2013.01); *F16K 1/2261* (2013.01)

(58) Field of Classification Search
CPC ....... F02M 26/70; F16K 1/222; F16K 1/2261; F02D 9/1015; F02D 9/107; F02D 9/1075
See application file for complete search history.

(56) References Cited

U.S. PATENT DOCUMENTS 6,135,415 A * 10/2000 Kloda .................... F02M 26/21
                                                    123/568.18
6,595,488 B2 * 7/2003 Zwick .................... F16K 1/224
                                                    251/214
(Continued)

FOREIGN PATENT DOCUMENTS

EP            1489285 A3     4/2008
JP        2002285863 A      10/2002
(Continued)

*Primary Examiner* — Joseph J Dallo
(74) *Attorney, Agent, or Firm* — Mark M. Friedman

(57) ABSTRACT

Modular valve for internal combustion engines to control the passage of gases or other aggressive fluids through an aperture in temperature environments from −40° C. to 700° C., said valve having several parts in stacked layers, that it has at least 2 parts wherein: the at least one core component (1) has a thickness (0.02 mm to 0.05 mm) much less than the thickness of the support plate (2) (0.05 mm to 2.0 mm), and the at least one core component (1) and the at least one support plate (2) are attached, and the at least one core component (1) has the remaining dimensions higher than those of the at least one support plate (2a, 2b), in order to form a protruding edge (1r) which will deflect in the contact area with the wall of the opening (5) when pressed against the wall of the opening (5) thereby increasing the valve closing angle.

14 Claims, 6 Drawing Sheets

(51) Int. Cl.
*F16K 1/226* (2006.01)
*F16K 1/22* (2006.01)

(56) References Cited

U.S. PATENT DOCUMENTS

| | | | | |
|---|---|---|---|---|
| 2005/0097745 | A1* | 5/2005 | Arai | B29C 45/14377 |
| | | | | 29/890.12 |
| 2005/0183705 | A1* | 8/2005 | Nanba | F02D 9/1045 |
| | | | | 123/568.24 |
| 2005/0199850 | A1* | 9/2005 | Hannewald | F02D 9/04 |
| | | | | 251/368 |
| 2007/0017491 | A1* | 1/2007 | Maeda | F02M 26/48 |
| | | | | 123/568.18 |
| 2007/0045586 | A1* | 3/2007 | Shimane | F16K 1/2261 |
| | | | | 251/306 |
| 2007/0240690 | A1* | 10/2007 | Nanba | F16K 31/041 |
| | | | | 123/568.18 |
| 2010/0206406 | A1* | 8/2010 | Nakamura | F16K 1/2268 |
| | | | | 137/544 |

FOREIGN PATENT DOCUMENTS

| | | |
|---|---|---|
| JP | 2008121803 A | 5/2008 |
| WO | 8601274 A1 | 2/1986 |

* cited by examiner a b a b a b     c     d

GAS RECIRCULATION VALVE FROM −40° C. TO 700° C

TECHNICAL FIELD

This valve is used in internal combustion engines for both gas recirculation valves (EGR) and in feeding systems, in order to increase performance reduce consumption and pollution and in general whenever we need to control gas flow or produce large amount of valves. The valve of the invention is intended to control the passage of gases or other highly aggressive fluids, in order to perform its function even in environments with temperatures from −40° C. to 700° C.

STATE-OF-THE-ART

FIG. 8 shows a contact profile detail of a valve as those currently used. Actual valves can be made of various metallic materials (brass, aluminum, steel or stainless steel) and are constituted by a plate of elliptical shape which closes the wall of a pipe or cylindrical body, wherein the major axis of the ellipse increases or decreases as the thickness increases or decreases. The valve thickness is required in order to mechanically produce a pressure which controls the fluid flow, and thus an elliptical shape is required in the case of circular pipes. The prior art valves requires high dimensional accuracy of manufacture to obtain a sealing acceptable by actual standards.

The aim of the invention is to control in a simple manner the flow of high temperature exhaust gases at low and high pressures, which nowadays can only be achieved with the type of simple valves mentioned above with approximately 2 mm thick. However, machining valves with 2 mm thick and diameters from 30 to 70 mm with the necessary accuracy is expensive as higher manufacturing times are required.

Additionally, these valves do not perform their function throughout the entire engine life which is about 15 years and will degrade by the action of the chemicals in suspension or diluted in the exhaust gases which, together with high temperatures, cause a chemical degradation especially if the valve is made of aluminum.

The proposed invention uses less raw-material and achieves a higher efficiency especially during the life of the engine. Due to its small thickness and high flexibility when closing, the core component (1) exerts a pressure on the contact area which contributes to prevent sticking of particles to the walls, thus removing them because the great flexibility contributes to a small scraping in the closing area. The closer to 90° is the closing angle the better will be the obtained tightness. A better tightness and a higher durability are obtained with this invention at a lower cost.

SUMMARY OF THE INVENTION

The valve according to the invention has the features of claim 1 and is manufactured by the manufacturing method of claim 14. The dependent claims are the most advantageous embodiments of the invention.

A second object of the invention is the method of manufacturing a valve according to the invention comprising the following steps:
 Placing a first support plate on a mounting table
 Placing a core component above the first mounting plate on the mounting table
 Attaching the core component to the support plate.

DESCRIPTION OF PREFERRED EMBODIMENTS

FIGS. 1a and b shows a plan view and a three-dimensional image of a valve according to the invention with the elliptical core component and the support plates with circular or elliptical shape and smaller dimensions.

FIGS. 4a and b shows a profile view of the system with the first valve according to the invention showing the operating mode of the valve and a zoom in of the closing of the core component showing its flexibility.

FIGS. 5a and b shows a view of various piping systems resisting to high temperatures.

Figure 6:
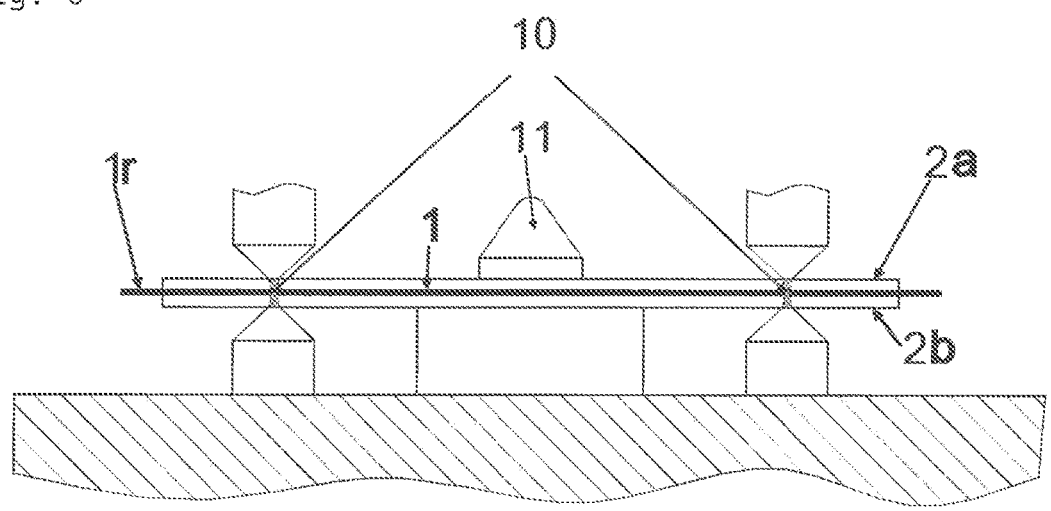

FIG. 6 is a view of the spot welding system showing the positioning of the support plates and the core component and the spot welding.

FIGS. 7a and b shows a view of the labyrinth near the axis.

Figure 8:
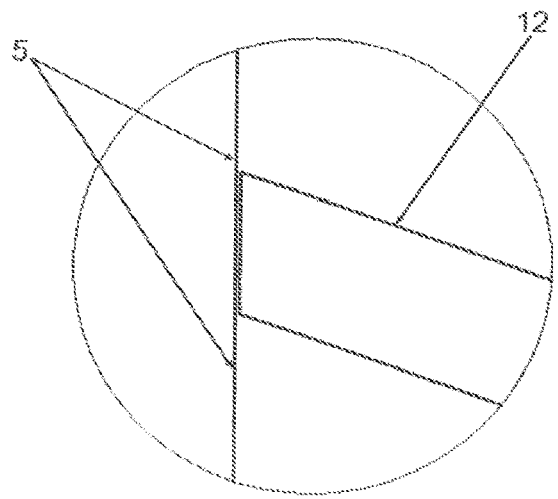

FIG. 8 shows the zoom in of the closing of a valve according to the state-of-the-art requiring a high dimensional accuracy of manufacture to obtain a sealing which is lower than the one of the valve of the invention.

Figure 9:
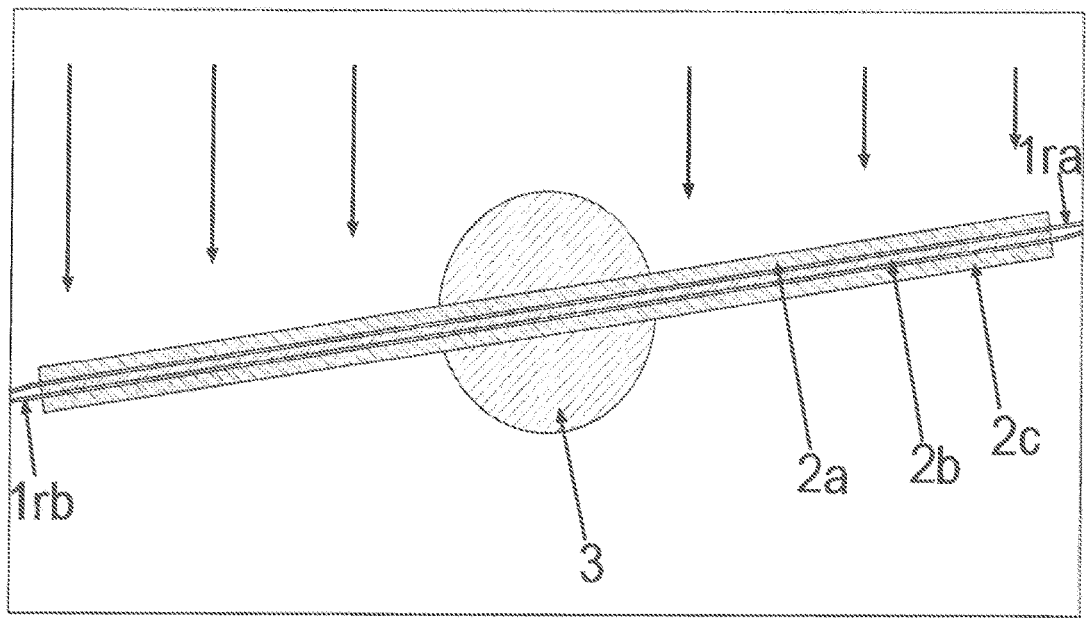

FIG. 9 shows details of a third valve according to the invention with two core components (1a, 1b) and three support plates.

FIGS. 10a, b, c and d shows details of three sections and respective zoom in
 The sections lines are:
 H-H zoom in K
 E-E zoom in F
 M-M zoom in N.

DETAILED DESCRIPTION OF THE INVENTION

Figure 1:
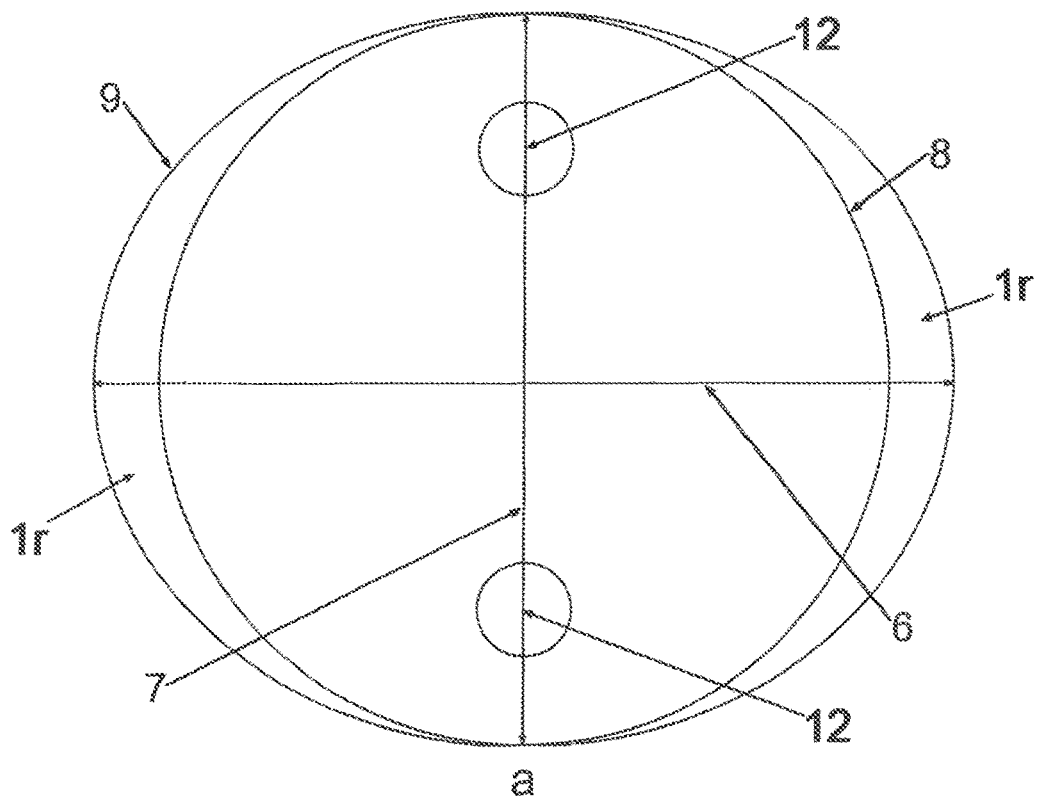
Figure 1:
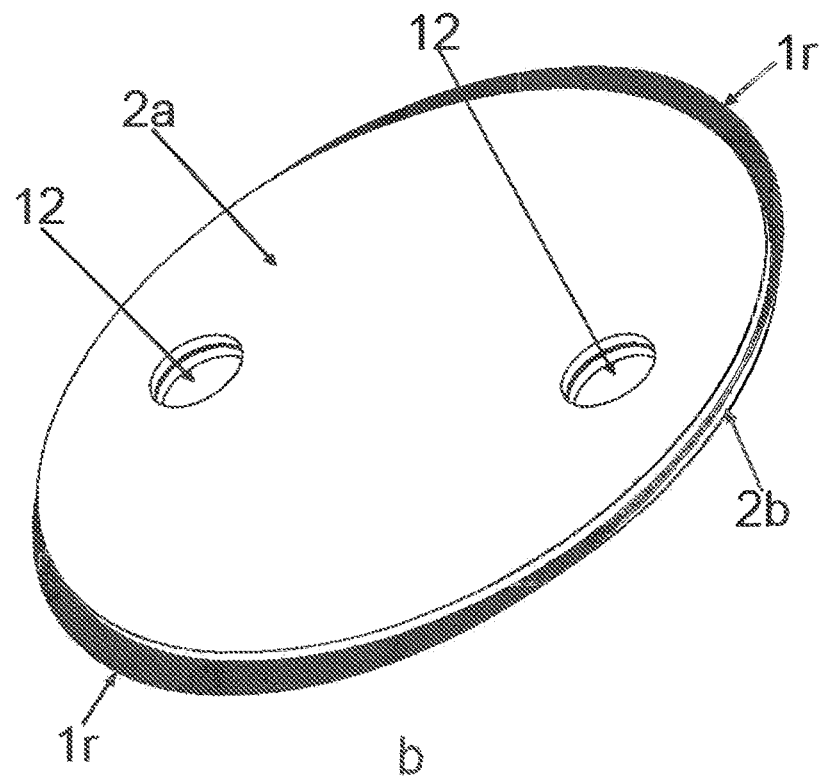
Figure 2:
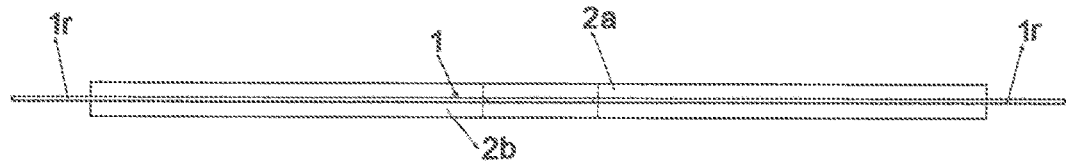
FIG. 2 shows a profile view of the valve according to the invention in which the two plates (2a and 2b) and the core component (1) have equal holes in the core component and in the plates to facilitate final assembly.
Figure 4:
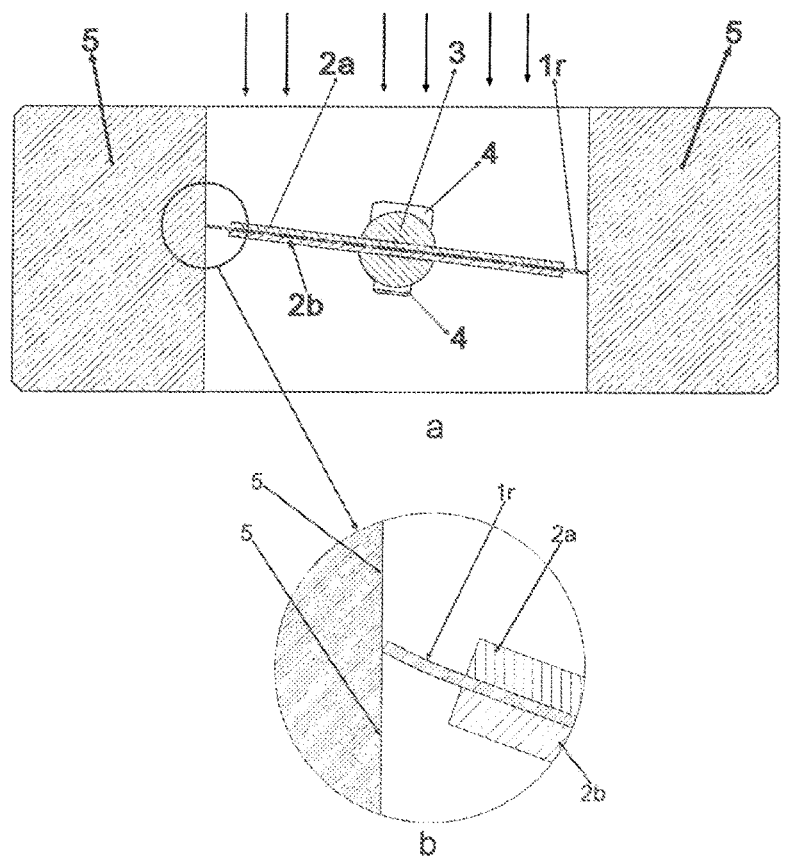

The valve of the invention can be seen in FIGS. 1, 2 and 4. The valve consists of three superimposed and stacked parts that form a sandwich: a core component (1) bounded by two support plates (2a, 2b).

The valve of FIGS. 1, 2 and 4 can control the gas flow and is easy to manufacture, also achieving greater efficiency by using the system which we call sandwich of several stacked plates in which the valve is constituted by a very thin core component (1), of elliptical shape, that is bounded by two support plates (2a, 2b) of circular shape, rather thicker than the core component (1) and serving as physical support to the core component (1) in order to provide it a greater stiffness, leaving free, due to the fact of one being elliptical while the other has a circular shape (see FIG. 1), a very thin protruding edge (1r) of the core component (1) which flexes in the contact area with the wall of the opening (5) when pressed against the wall of the opening (5), thereby increasing the valve closing angle and improving the sealing.

Figure 3:
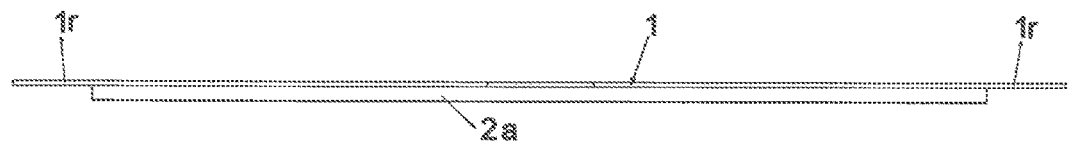
FIG. 3 shows a profile view of a second valve according to the invention with a core and one support plate only.

In case of small diameter openings only one support plate (2a or 2b) may be used, as shown in FIG. 3.

The core component (1) should be thin, preferably with thickness between 0.05 mm and 0.50 am.

The two support plates (2a, 2b) must have a thickness greater than the one of the core component (1), preferably between 0.50 mm and 2.0 am.

The two support plates (2a, 2b) which support the core component can have different thicknesses which facilitate the closure geometry and/or the physical strength.

The core component (1) has a surface area larger than the support plates (2a, 2b) and forms a contact edge (1r) which will allow to seal against the walls of an opening (5).

Depending on the flow rates and pressures involved, the core component (1) and the support plates (2a, 2b) will have different shapes and thicknesses. The smaller the passage area the smaller will be the thickness of the core component (1) or of the support plates (2a, 2b), wherein the thickness of the core component (1) is always smaller than that of any of the support plates (2a, 2b).

FIG. 4 shows the valve closed. The core component (1) will seal against the walls of an opening (5), such as a pipe or a cylindrical body. As shown in the zoom in, when closing the valve the small thickness of the core component (1) will allow a slight bending, according to the lock torque and the distance to the edge of the support plate (2a, 2b), which facilitates closing during use and reduces the production costs. It is noted that the small thickness of the core component (1) will allow closing the valve with angles quite higher than those of the actual valves, which reduces the leakage flow and enhances the tightness during the system life.

Figure 7:
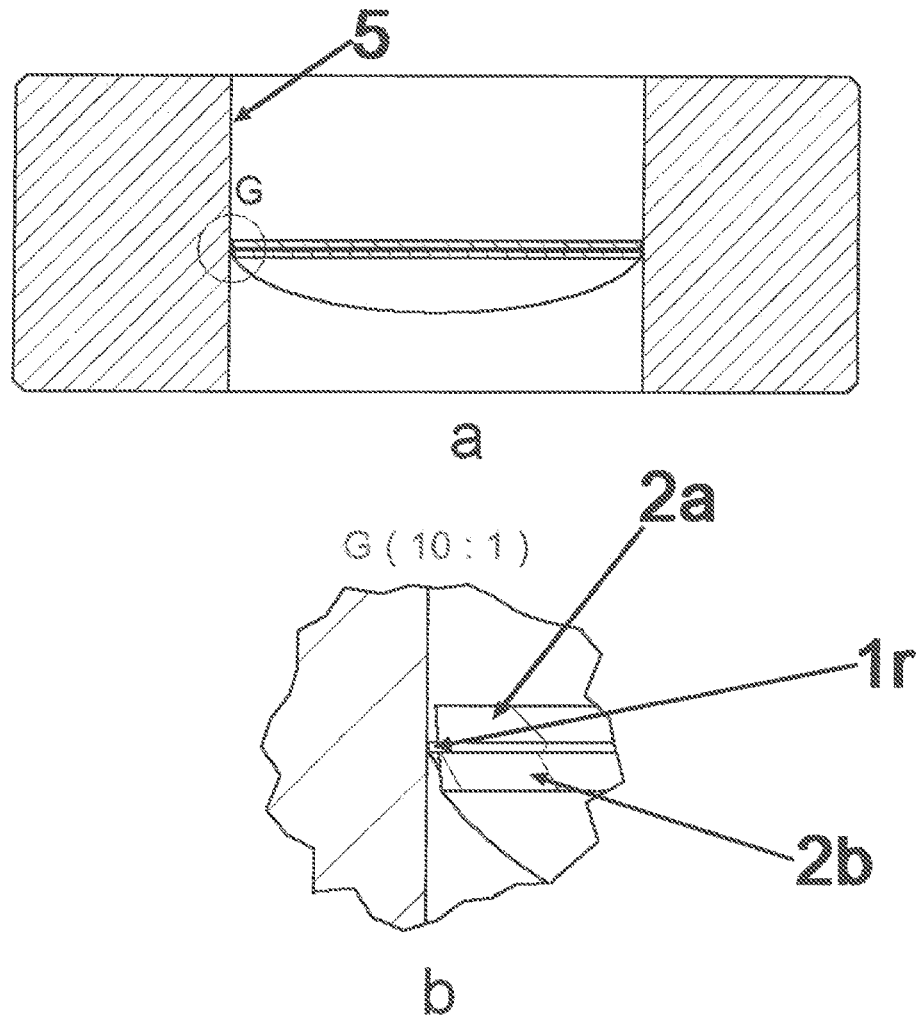

The fact that the valve is constituted by a core component (1) and two support plates (2) improves the tightness near the rotation axis, as shown in FIG. 7. The size of the edge (1r) is smaller near the axis and decreases from a maximum value near the major axis of the ellipse to a minimum value near the minor axis of the ellipse.

Figure 5:
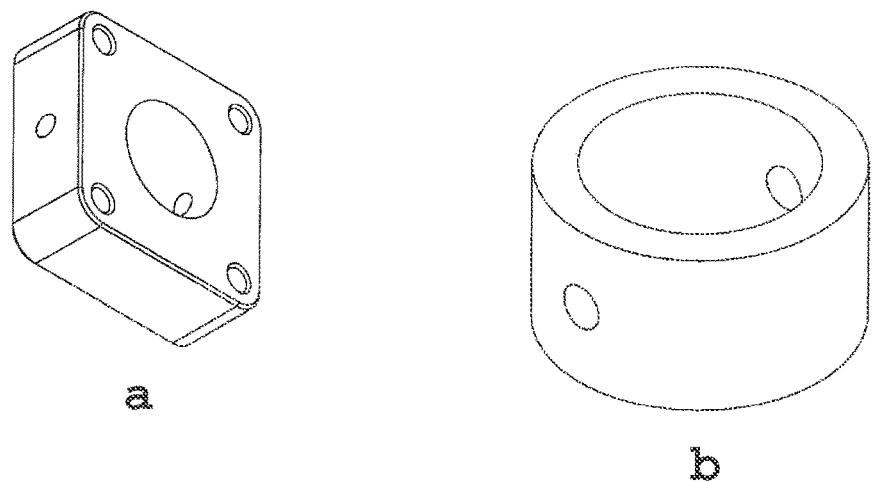

In the case of the first valve according to the invention, the core component (1) has an ellipse shape in order to adapt to the valve closing seat (5) which is cylindrical. However, one person skilled in the art understands that, when the geometry of the cylindrical passage is different, the geometry of the core component and support plates can vary in order to ensure the closing of the passage. FIG. 5 shows examples for a pipe (5) or cylindrical body.

Depending on the flow rates and the pressures involved, the parts (1) and (2) will have different shapes and thicknesses or may eventually use only one support plate. As can be seen in FIG. 3, the valve of the invention can eventually use only one support plate (2a or 2b), once this support plate is able to provide enough stiffness to the valve.

The core component (1) usually has the shape of an ellipse as shown in FIG. 1 (9) to adapt to the closing of the cylindrical passage shown in FIG. 4 (5) however, in the case of a passage having a different geometry, the principle of a core component sandwiched between two support plates is maintained for other shapes in order to ensure closing of said passage.

The two support plates (2a, 2b) typically have a circular shape (8), which facilitates its manufacture, and the function of the support plates is to limit the flexion of the core component to a minimum in order to ensure the pipe closing, thus providing the core component with stiffness and limiting its deformation to what is strictly needed.

The support plates (2a, 2b) may have a shape other than circular depending on the working conditions, although they should always ensure the proper operation of the core component (1).

As shown in FIG. 1, the core component (1) has the shape of an ellipse with a larger diameter (6) and a smaller diameter (7), in which the larger diameter depends on the closing angle and the smaller diameter (7) is approximately equal to the diameter of the opening (5) in the pipe for passage of fluid.

The valve is moved when opening and closing through the rotation on the axis (3). In the case of valves of the prior art, in order to the valve rotate the core component (1) can touch or not the walls of the opening (5), depending on the desired tightness.

Figure 10:
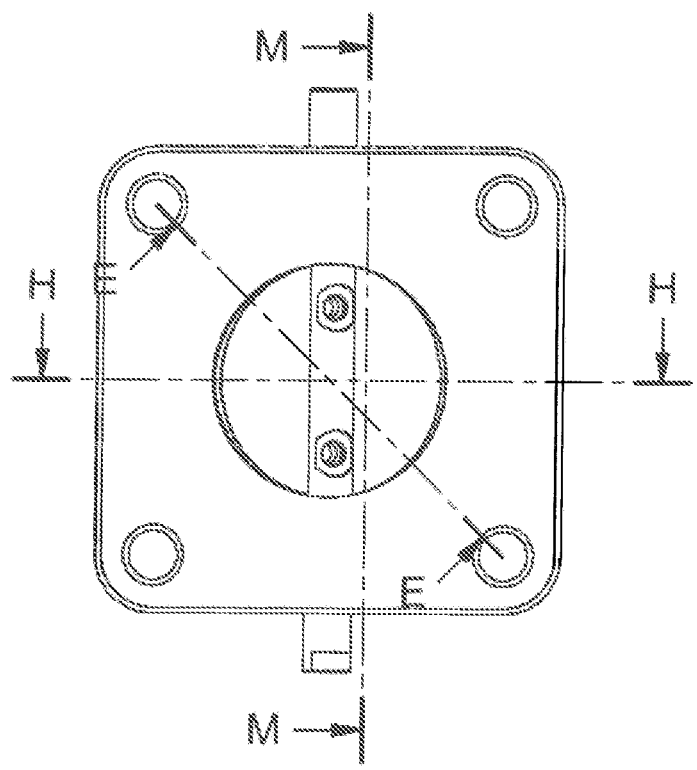
Figure 10:
Figure 10:
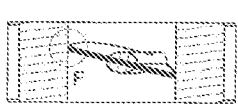
Figure 10:
Figure 10:
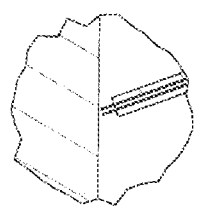
Figure 10:
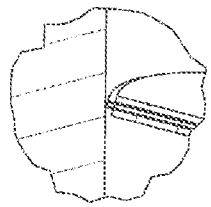
Figure 10:
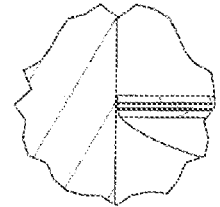

With the valves of the invention, if it is required enhancing the sealing, the core component (1) can be larger than the support plates (2a, 2b) in a way that the edge (1r) of the valve may extend along the entire perimeter of the valve. The core component (1) can bend slightly against the wall in the vicinity of the axis (3), where the core component (1) is very close to the wall and where virtually there is no bending. As shown in FIG. 7 and FIG. 10 Section M-M, near the areas close to the axis (3) the leakage flow between the wall of the opening (5) and the valve can be reduced if the edge (1r) extends parametrically and the core component (1) preferably also have in these areas a slightly larger dimension than the support plates (2a, 2b) but smaller than the opening (5) in the areas near the axis (3) forming an edge. Since the core component (1) and the support plates (2a, 2b) have different distances from the wall of the opening (5) in the direction of the flow and in areas near the axis (3), a labyrinth to the flow is formed (FIG. 7) which will increase the flow turbulence and decrease the leakage flow.

Alternatively, the core component (1) may have a similar dimension (slightly larger or smaller) to that of the opening (5) in at least one of the areas near the axis (3), so that the edge (1r) will cause a sweep effect on the walls of the opening (5) in order to remove any fouling tending to form in the walls of the opening (5) in the areas near the axis (3), however without preventing the valve rotation.

The core component will touches or not the wall of the pipe depending on the application and on the desired effect, e.g. when controlling gases contaminated with products from the combustion of hydrocarbons the fact that the core component slightly sweeps on the walls of the piping will cause a wall cleaning, in the contrary the products will deposit on the wall thus hindering the proper operation by decreasing the tightness.

The manufacture of this valve is simple and economical and prevents very tight tolerances.

The method of manufacturing a valve according to the invention primarily consists in obtaining the core component (1), preferably though a thin cutting process, and thereafter manufacturing the support plates (2a, 2b), preferably by a normal cutting process.

According to the invention, the support plate (2b) is then placed on a mounting table, positioned by the guides (11). The core component (1) is placed on the support plate (2b) also positioned by guides (11) and finally the support plate (2a) is placed positioned by the guides (11) and then the assembly is welded, glued or riveted at points 10, thus obtaining the sandwich ready to be mounted on the axis (3). The holes existing in the core component and support plates (2a, 2b) ensure the accuracy of the assembly and will also serve to mount the assembly in the axis (3).

FIG. 6 shows a valve according to the invention which has a core component (1) sandwiched between two support plates (2a, 2b). However one person skilled in the art easily recognizes that the process is valid for any number of core components and support plates. Various support plates and core components can be stacked alternately with the help of guides (11) before the attachment between them is carried out.

The attachment of the core component and the support plates can be made by welding, riveting, gluing or another joining process. It is essential to ensure a geometry which will remain until the final assembly.

The two support plates (2a, 2b) ensuring the closing of the valve through an axis (3) are secured with two screws (4) or welding to guarantee a stiff connection to the axis (3).

The plates may have different shapes depending on the applications and may even approach the shape of two hemispheres.

The assembly of the valve on the axis (3) can be carried out automatically as shown in FIG. 4, and for that reason "knurls" may be created in one of the support plates. Any one of the support plates (2a, 2b) may have small deformations (knurls) on the outer surface aiming to form a guide and to enable the orientation of the axis during the coupling of the valve in the axis (3). The knurls prevent the valve from falling during the axis (3) assembly, after controlling the flow rate, while screws (4) or welding or gluing keep it in the ideal position for the lifetime.

To increase the resistance to high temperatures one can use pipes or other machined components made of treated and rectified stainless steel or other steels, which are capable of withstanding high temperatures (700° C.) as can be seen in the two examples of FIG. 5. These pipes or machined components, usually rectified, may be used as single components or as part of the system in order to ensure greater tightness.

As can be seen in FIG. 5, one can use various types of profiles for fluid flow such as rectified profiles, inserts into the pipe, or end devices. The pipes are usually cylindrical but may be square or rectangular and apply the same sandwich principle of the core component between two support plates.

FIGS. 9 and 10 show the geometry of a valve with two core components and three support plates according to the invention. The two core components form two surrounding edges.

Three sections have been obtained through centrally cutting the valve: H-H, B-E and M-M:
  H-H perpendicular to the rotation axis
  E-E at 45° to the axis
  M-M parallel and near to the axis As seen in the zoom in K, F and N of the closing areas which are indicated by a circle, the dimensions of the edges vary, being more protruding in the zone of the section H-H and less protruding in the zone of the section M-M. A larger edge in the contact areas between the valve and the opening facilitates small bending thereof, in accordance to the desired tightness. In the section M-M near the axis region, the edge(s) is (are) very small although the labyrinth formed favors the sealing.

The section E-E shows an intermediate edge between the maximum and minimum zones. The dimension of the edge varies continuously between the maximum and minimum values. As it is evident, the edge increases or decreases with the size and shape of the plates.

In any valve the core component of the invention can preferably be made of steel, stainless steel or plastic.

The support plates (2a, 2b) can also be made of steel, stainless steel or plastic

INDUSTRIAL APPLICATION

Diesel and gasoline engines or recycling gas systems can benefit from this invention. Reducing the pollution and the new technologies developed for internal combustion engines benefit from this new valve which contributes to facilitate compliance with European standards.

It can also be applied for the control of fluid flow in pipes under adverse conditions.

The invention claimed is:

1. Modular valve for internal combustion engines to control the passage of gases or other fluids through a pipe, in temperature environments from −40° C. to 700° C., said modular valve formed by several parts in stacked layers being characterized by comprising:
   at least one core component (1);
   at least one support plate, attached to a side surface of a core component (1);
   wherein:
   a support plate is attached to a side surface of a core component (1) through spot welding or gluing;
   the thickness of a core component (1) is less than the thickness of a support plate;
   the surface area of a core component (1) is larger than the surface area of a support plate, forming a protruding edge (1r) extending perimetrically in relation to the at least one support plate attached to the core component (1), such that said protruding edge (1r) decreases from a maximum size value at a major axis of the core component (1) to a minimum size value at a minor axis of the core component (1), the minor axis being perpendicular to the major axis; said protruding edge (1r) adapted to flex in the contact area with a wall of the pipe when pressed against said wall of the pipe.

2. Modular valve according to claim 1, characterized by comprising a core component (1) and two support plates (2a, 2b); the first and the second support plates (2a, 2b) being attached to each side surface of the core component (1).

3. Modular valve according to claim 2, characterized by comprising
   a second core component, attached to the opposite side of the second support plate; and
   a third support plate, attached to the opposite side of the second core component.

4. Modular valve according to claim 1 characterized in that the thickness of a core component (1) is between 0.05 mm and 0.50 mm.

5. Modular valve according to claim 4 characterized in that the thickness of a core component is 0.10 mm.

6. Modular valve according to claim 1 characterized in that the thickness of a support plate is between 0.20 mm and 2.0 mm, preferably 0.40 mm.

7. Modular valve according to claim 6 characterized in that the thickness of a support plate is 0.40 mm.

8. Modular valve according to claim 1 characterized in that a support plate comprises knurls for mounting an axis (3).

9. Modular valve according to claim 1 characterized in that the protruding edge (1r) of a core component (1) extends over the entire perimeter of the support plates.

10. Modular valve according to claim 1 characterized in that the core component is of an elliptical shape and the support plates are of a circular or elliptical shape, wherein the protruding edge (1r) extends over the entire perimeter of the support plates, decreasing from a maximum size value at a major axis of the core component (1) to a minimum size value at a minor axis of the core component (1); and wherein the core component (1) has a surface area smaller than the area of the pipe opening at its minor axis, thus providing a labyrinth to the stream of the leakage flow.

11. Internal combustion engine with controlled air entry having one or more pipes or cylindrical bodies (5) at the inlet and outlet and at least one modular valve according to claim 1.

12. Method for manufacturing a modular valve according to claim 1 characterized by the following steps:

Placing a first support plate on a mounting table;

Placing a core component above the first support plate on the mounting table;

Attaching the core component to the support plate through welding, gluing or riveting.

13. Valve manufacturing method according to claim 12, characterized in that a second support plate is placed over the core component before attachment.

14. Valve manufacturing method according claim 12, characterized in that the attachment is performed through spot welding, laser or gluing.

\* \* \* \* \*